US008356796B2

(12) United States Patent
Martin

(10) Patent No.: US 8,356,796 B2
(45) Date of Patent: Jan. 22, 2013

(54) UNITARY SHAFT EXTENDER APPARATUS

(75) Inventor: Stephen S. Martin, Huntington Station, NY (US)

(73) Assignee: Duro Dyne Corporation, Bay Shore, NY (US)

(*) Notice: Subject to any disclaimer, the term of this patent is extended or adjusted under 35 U.S.C. 154(b) by 149 days.

(21) Appl. No.: 12/953,313

(22) Filed: Nov. 23, 2010

(65) Prior Publication Data

US 2011/0119869 A1 May 26, 2011

Related U.S. Application Data

(60) Provisional application No. 61/264,059, filed on Nov. 24, 2009.

(51) Int. Cl.
*F16K 1/22* (2006.01)
*F23L 13/02* (2006.01)

(52) U.S. Cl. ......... 251/308; 251/305; 251/306; 126/292

(58) Field of Classification Search .................. 126/292, 126/295, 286, 307 R; 251/305, 30, 264, 251/265, 267, 268, 308, 66, 266, 292; 74/15.6; 403/1, 13, 43; 464/90
See application file for complete search history.

(56) References Cited

U.S. PATENT DOCUMENTS

| | | | | |
|---|---|---|---|---|
| 1,926,287 | A | 12/1922 | King | |
| 2,488,006 | A * | 11/1949 | De Roo | 126/285 R |
| 2,764,930 | A | 2/1956 | Turchick | |
| 4,646,715 | A * | 3/1987 | Russell | 126/292 |
| 6,035,849 | A * | 3/2000 | Bluestone | 126/285 R |

* cited by examiner

*Primary Examiner* — John K Fristoe, Jr.
*Assistant Examiner* — Kevin Barss
(74) *Attorney, Agent, or Firm* — Barry G. Magidoff

(57) ABSTRACT

A unitary damper shaft extender for HVAC air ducts, the extender comprising a unitary apparatus comprised of two interlocked, but relatively movable members. One of the members being capable of interlocking with a damper shaft, and the second member being slidably movable to cover, and thereby lock the first member to the damper shaft, so as to extend its length beyond the usual insulation used for air ducts.

2 Claims, 10 Drawing Sheets

241

349
245
241

349
243
247
349
245

243

UNITARY SHAFT EXTENDER APPARATUS

This application claims the benefit of priority pursuant to 35 U.S.C. 119(e) from a U.S. provisional patent application having Application No. 61/264,059 filed Nov. 24, 2009.

FIELD OF THE INVENTION

The present invention relates to an improved extension for handle connections to air duct dampers.

BACKGROUND OF THE INVENTION

Damper assemblies in HVAC air ducts include a movable damper capable of Hocking or diverting air, or other gases, passing through the interior of the duct, intended to heat or cool the building in which it is located. It is often desirable to manually control the damper, and for this purpose a control shaft is attached to the damper and extends through an opening in the duct wall to the exterior of the duct, A handle is fitted onto the outer end of the control shaft, and is secured to the control shaft by, e.g., a nut.

Generally, such damper assemblies contained within short sections of a duct are assembled at the factory, to insure a close fit in the wall opening to prevent loss of air pressure and are commonly available in complete units. The control shafts on the prefabricated assemblies extend out from the outer surface of the duct only a short distance. However, it is often desirable, as an energy saving method, to have the entire length of the air duct, including the damper assembly portion, wrapped in insulation; in such a situation, usually the factory installed control shaft does not extend out beyond the insulation layer, interfering with the operation of the handle on the control shaft, to operate the damper. Many attempts have been made to simply extend the length of the shaft for the handle so that the handle can easily move beyond the thickness of the insulation. For example, two different concepts are shown in U.S. Pat. Nos. 4,646,715 and 6,035,849. They have all had the problems of undue complexity, because of the number of parts that the ultimate installer was required to handle.

Accordingly, it is an object of the present invention to provide a product that will simplify the end user/installer's work in adding a unitary extension to the damper apparatus that will effectively extend the control shaft of a damper assembly beyond the layer of insulation, permitting a certain amount of regulation as to the length of the control shaft.

DESCRIPTION OF PREFERRED EMBODIMENTS

Figure 1:
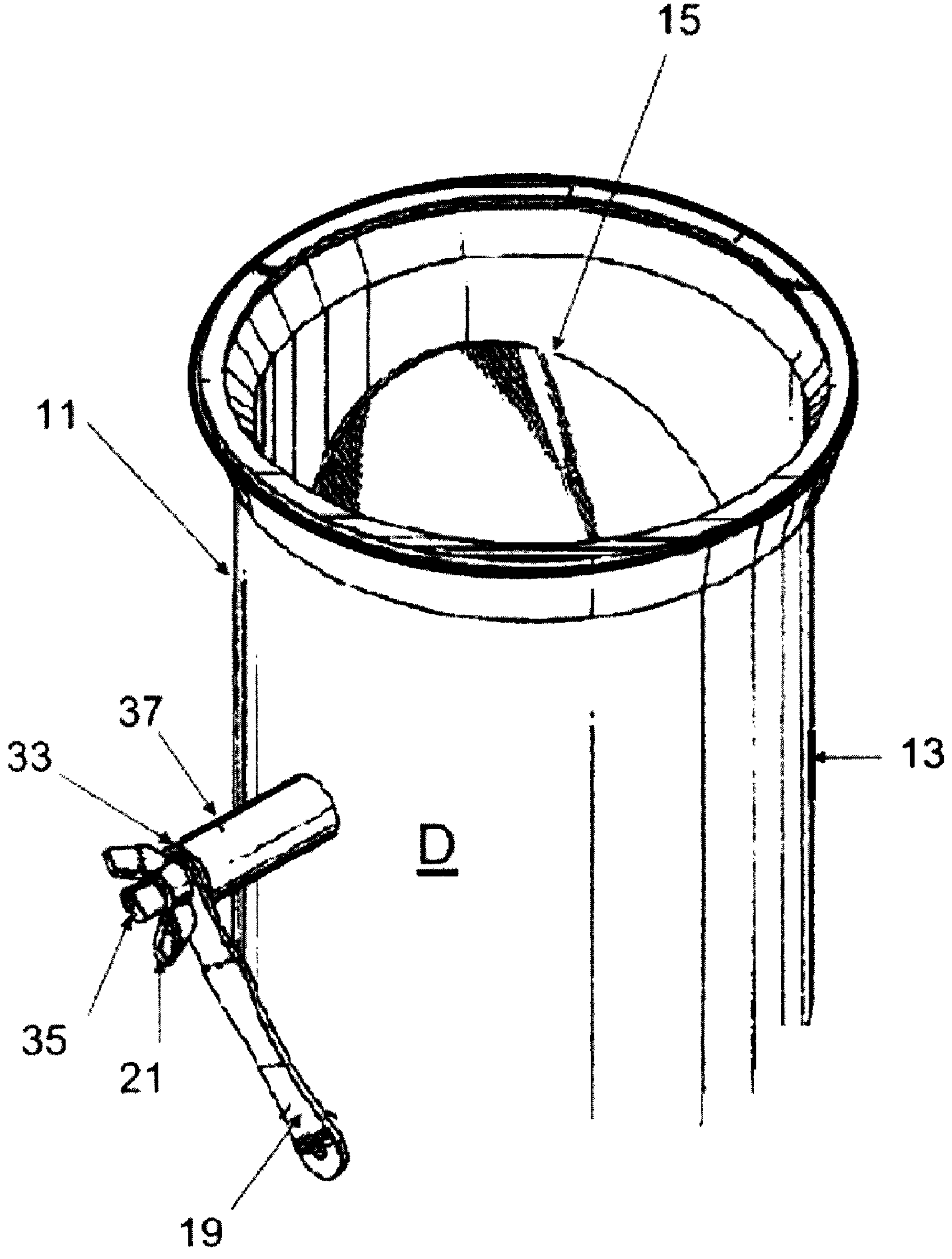
Fig. 1 PRIOR ART
FIG. 1 is a schematic isometric view of the damper assembly with an extender element in accordance with the prior art.
Figure 1A:
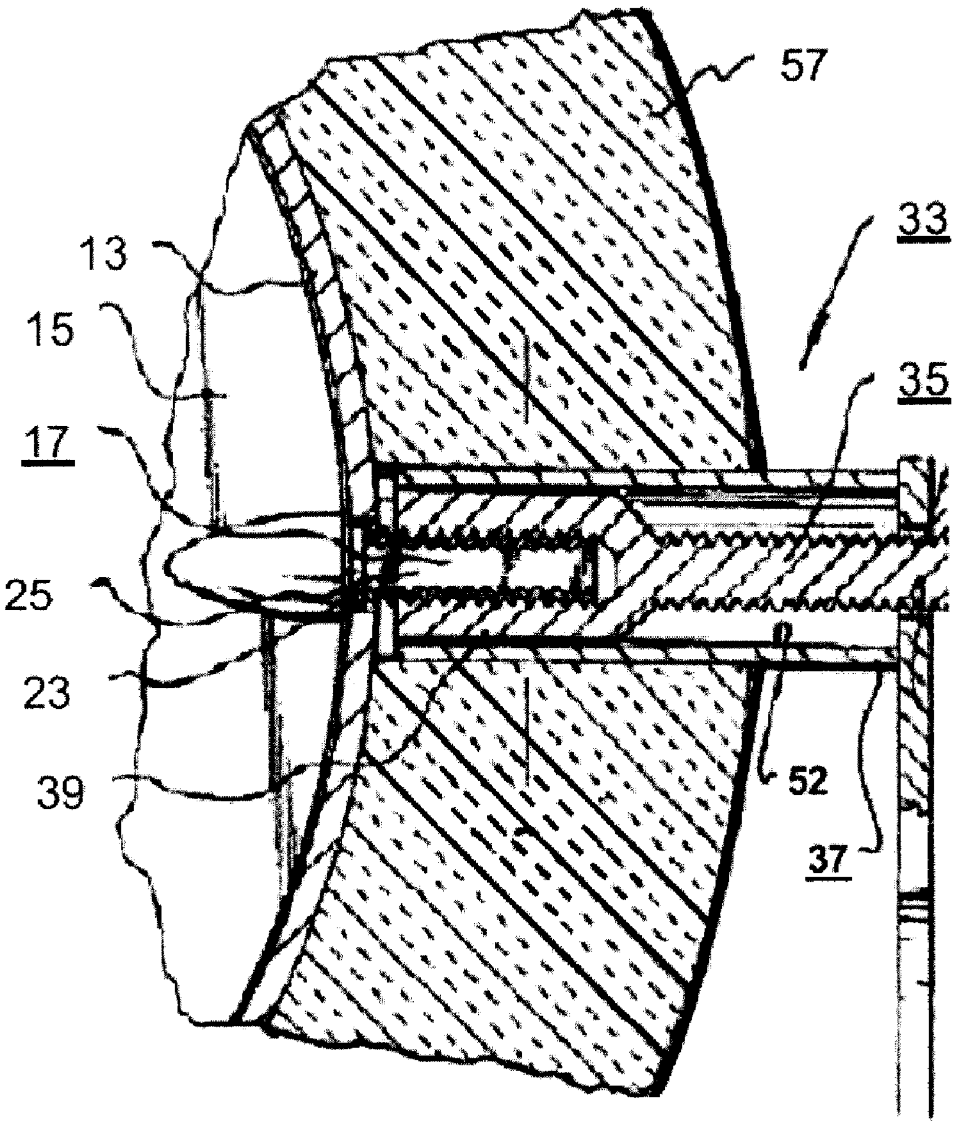
Fig 1A Prior Art
FIG. 1A shows in cross-section the prior art extender passing through an insulated wall of a duct.
Figure 2:
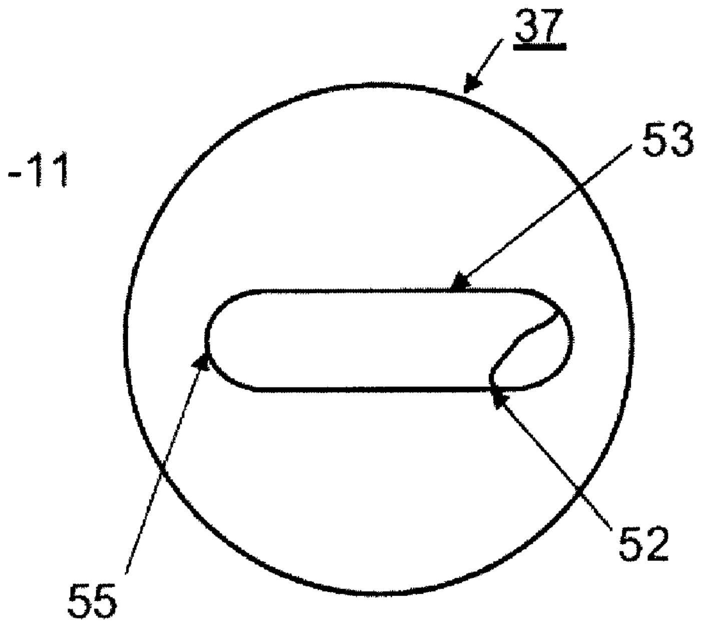
Fig 2 PRIOR ART
FIG. 2 is a schematic end view of the securing member of the prior art shown in FIG. 1.
Figure 3:
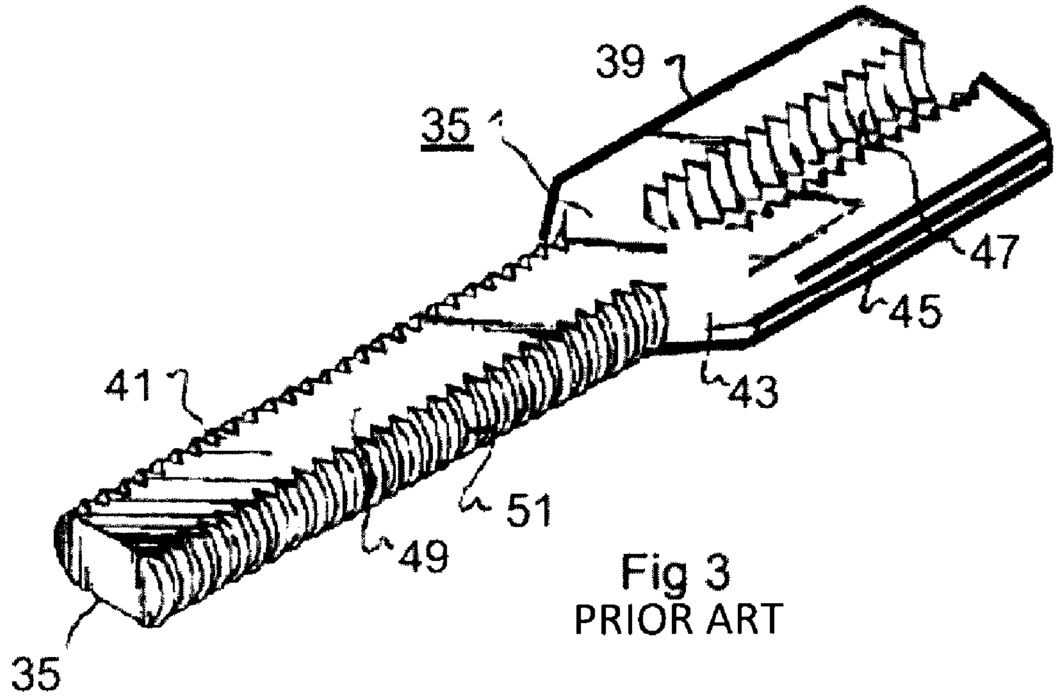
Fig 3 PRIOR ART
FIG. 3 is a schematic isometric view of one part of the multi part extension member of the prior art.

In FIGS. 1 and 1A, there is shown a damper assembly 11 in accordance with the prior art, including an extended handle shaft. FIGS. 2 and 3, show the two piece extender of the prior art. The damper assembly 11, which is inserted into ductwork to control the flow of air, includes a portion or section of a duct 13, a damper 15, an extended control shaft 33, 37, a handle 19 and a wing nut 21.

The duct section 13 is of a conventional type, useful for conveying air through its interior portion and having ends that provide for coupling, at each end, for insertion into duct works, which connect between the air source and the outlets. Damper 15 is installed within the duct 13 and is so sized as to be able to block flow through the duct when in a blocking position extending transverse to the axis of the duct. The damper 15 is installed to rotate about an axis, that is perpendicular to the longitudinal axis of the duct, between the blocking and a fully open position so as to allow control over the flow of air through the duct.

Figure 5:
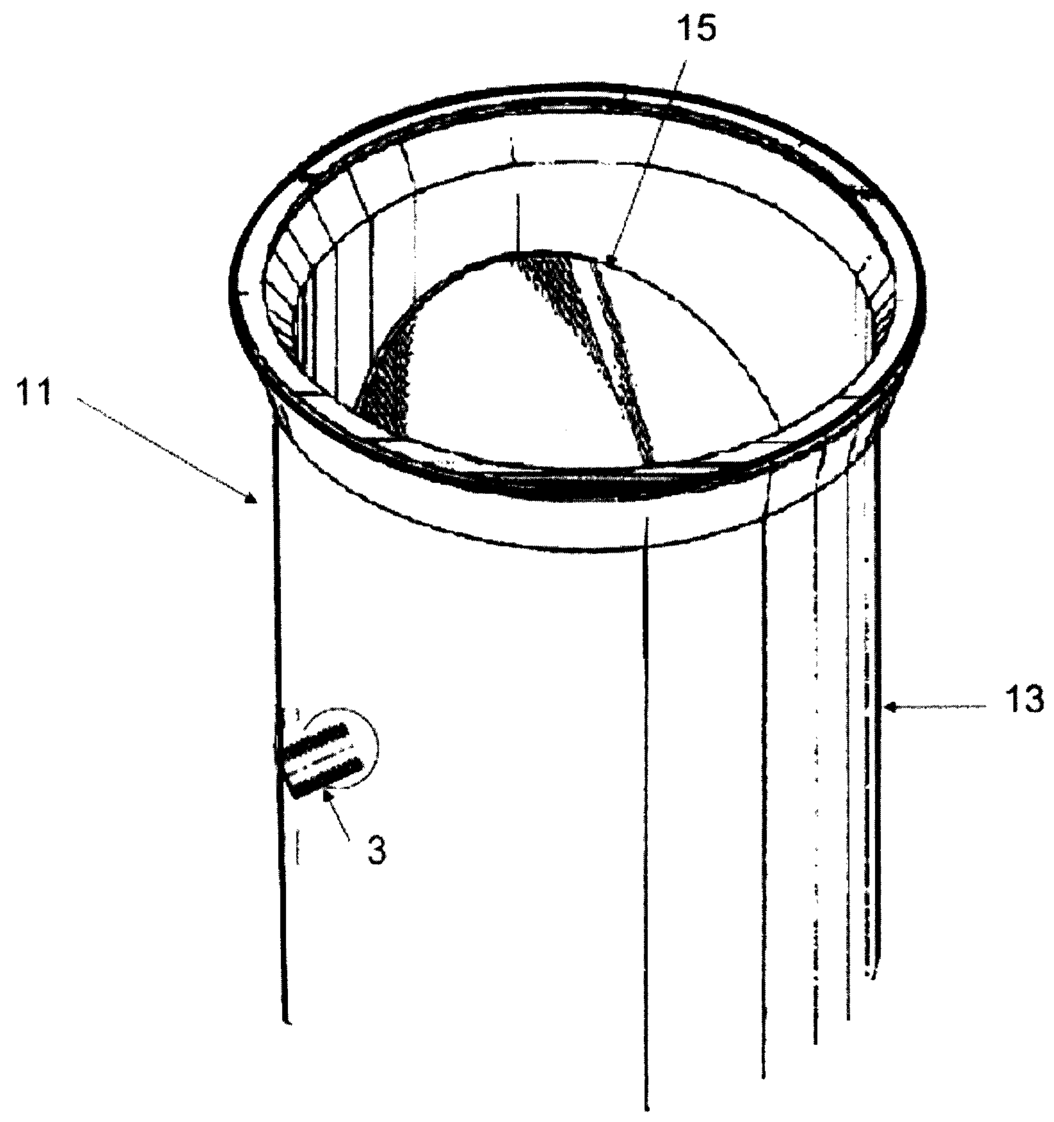
Fig. 5 PRIOR ART
FIG. 5 is a schematic isometric view of the exterior of the damper assembly showing the original, nonextended shaft.

The extended control shaft 37 is coupled to the damper 15 and is coaxial with the damper axis of rotation, and extends outwardly through an opening 23 in the wall of the duct 13 (see FIG. 5). The original short control shaft 3 is generally a double truncated cylinder with a pair of parallel opposed flat keying sides 25, and a pair of opposed arcuate sides 27 merging with and between the two opposing flat sides 25 (see FIG. 5). The arcuate sides 27 are threaded for cooperating with the wing nut 21 in securing the handle. Turning the handle 19 causes the control shaft 17 to rotate.

The illustrated extension apparatus 33 of the prior art includes a two part extension mechanism including an outer sleeve 37 having a fully enclosed slot extending longitudinally therethrough (see FIG. 2), complementary to the shape of the separate y-shaped extension member, shown in FIG. 3.

Figure 4A:
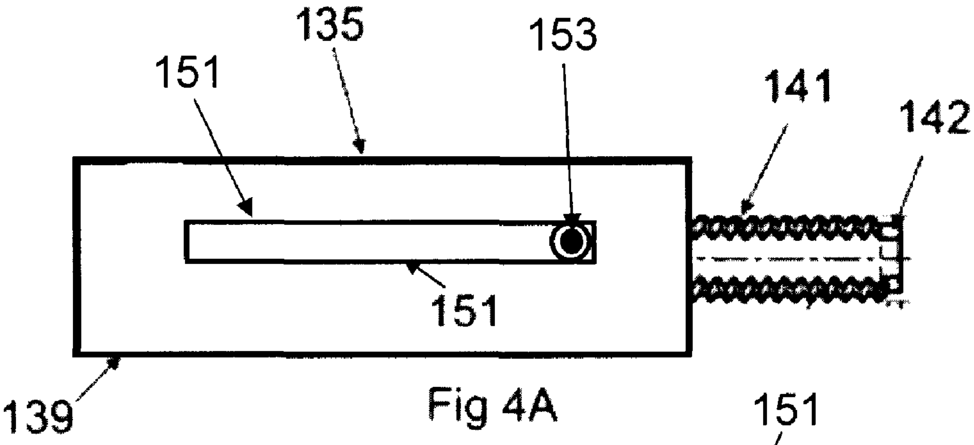
FIGS. 4A and 4B are longitudinal top views of the assembled extension apparatus of the present invention; showing the internal extension member in two different positions.

One embodiment of the present invention provides the installer with a unitary extension part 135 to be connected to the original short handle original control shaft 3, which is shown in FIGS. 4A and B and 6-11. The unitary extension part 135 has an outer collar portion 139 and a y-shaped shaft extender portion 141. The extender portion 141 has two flat sides 143 that are parallel to one another and extend between an open end and a closed end. The thickness of the extender portion 141, as measured between the flat sides 143, is the same as that of the original control shaft 3. The extender portion 141 has arcuate sides 145 extending between the flat sides 143. A threaded bore 147 extends longitudinally inward from the open y-end and is sized so as to receive the outer end portion of the original control shaft 3, which is also as shown in FIG. 5.

Figure 4B:
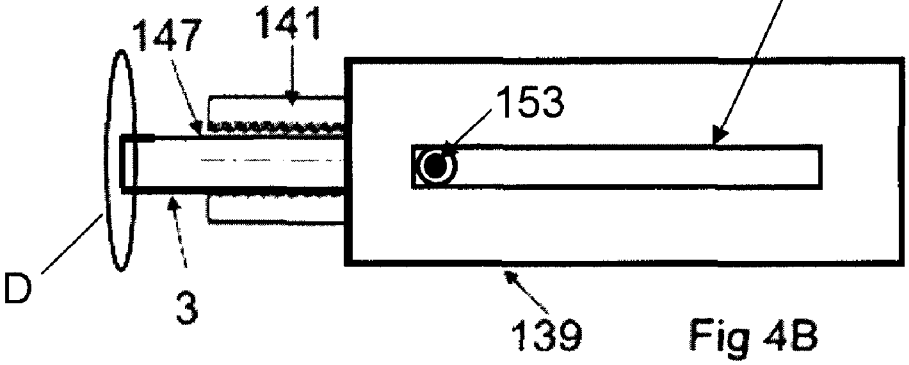

The y-shaped extension portion 141 is permanently slidably locked within the collar 139, capable of sliding along a limited path along the internal bore 148 of the collar 139. The extent of the sliding motion is shown by FIGS. 4A-B. A longitudinal slot 149 extends through the wall of the holder 139 along the entire length of the collar 139. The longitudinal slot 149 has a width less than the width of the bore 148, which generally is complementary in shape, but has sufficient play to permit easy sliding of the extension portion 141 along the bore. This prevents dislocation of the extension connector 141 from out of the bore 148.

Diametrically opposite to the location of the longitudinal slot 149 is a second guide slot 151, narrower and extending along only a portion of the length of the collar 139. A guide pin 153 is secured to the flat surface of the extension connector 141 extending radially outwardly through the guide slot 151, limiting the longitudinal motion of the connector 141 along the bore 148, and thus preventing the extension connector 141 from falling out from the holder 139.

Figure 12A:
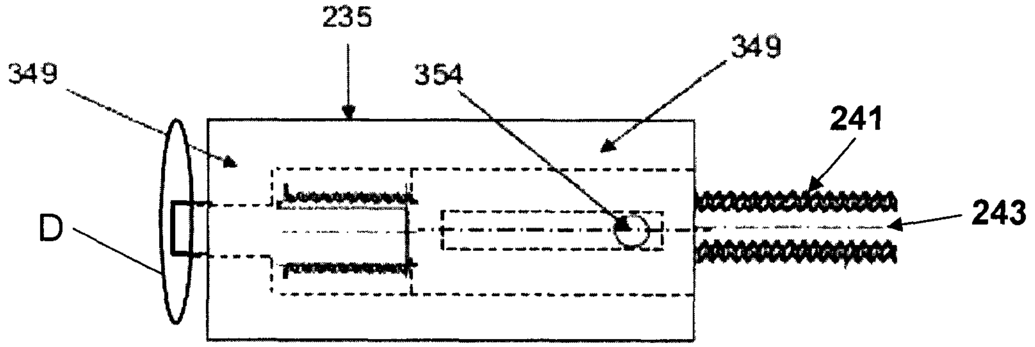
FIGS. 12A, B are schematic longitudinal top views of the assembled extender apparatus of the third embodiment of the present invention, showing the two outermost positions of the extender.

As shown in FIG. 4B, at one end of its travel, the y-shaped end 147 of the connector 141 extends out of one end of the collar bore, permitting it to be connected to the original shaft 3, extending out from the duct wall "D". Once the y-shaped end 147 of the connector is properly connected by the threaded surface to the original shaft 3, the collar 139 is permitted to slide down to cover the thus connected connector 141 and shaft 3, holding them together, as shown in FIGS. 4B and 12A. As a final step, the handle 19 is secured to the straight end 142 of the y-shaped extension connector 141, which matches the cross-section shape of the original shaft 3, and is secured in place by the original wing-nut 5, as is shown in FIGS. 1 and 1A. As shown, the wing nuts secure the handles and the collar 139 onto the connector 141, locking the unitary extension apparatus onto the original shaft.

Figure 7:
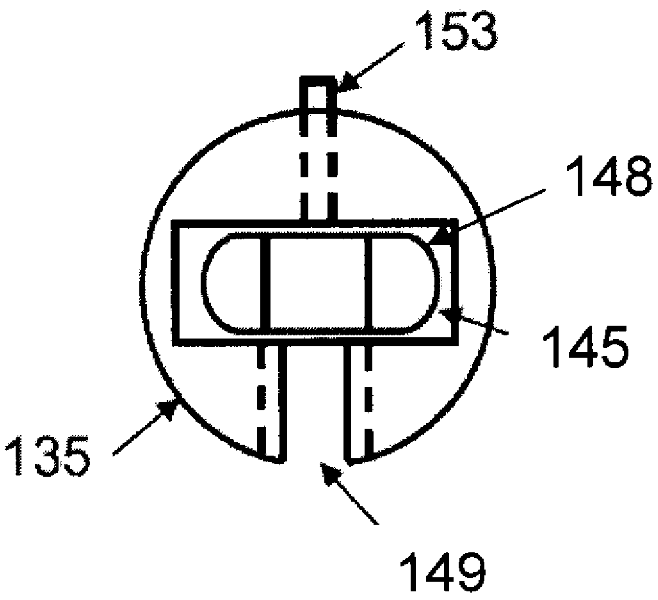
FIG. 7 is a schematic end view of the assembled extender apparatus of the present invention.
Figure 6:
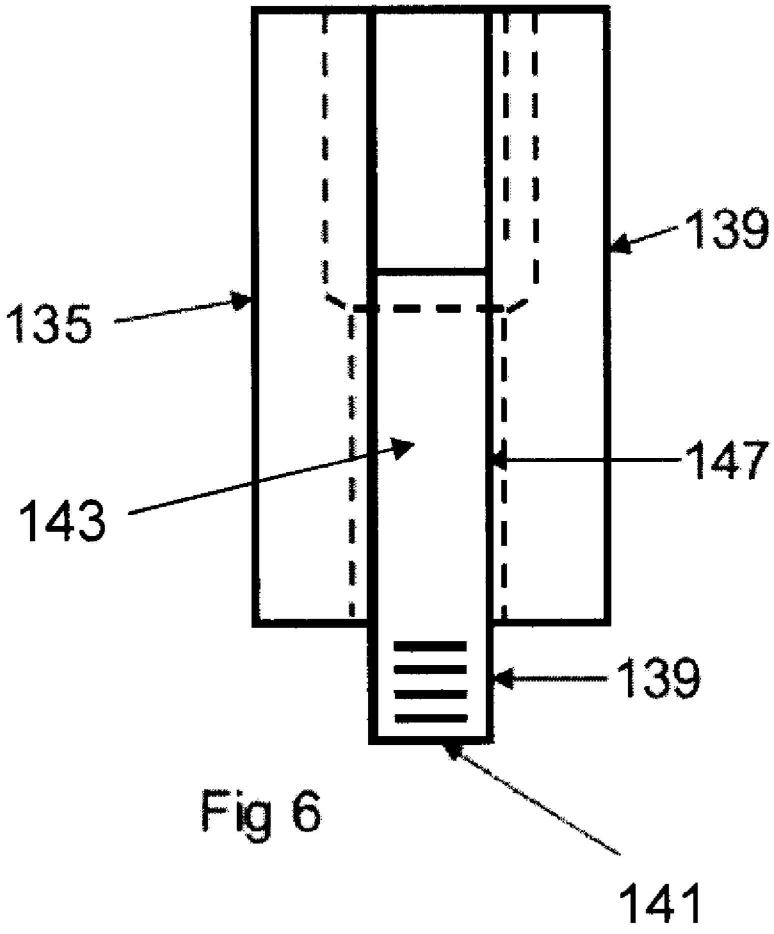
FIG. 6 is a schematic longitudinal bottom view of the assembled extender apparatus of the present invention.
Figure 11:
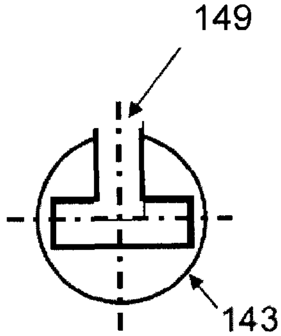
FIG. 11 is a schematic end view of the collar portion of the assembled extender apparatus of the present invention.
Figure 11A:
FIG. 11A is a schematic end view of a second embodiment of the collar portion of the unitary extender apparatus of the present invention.

The schematic representations of the unitary connection apparatus 135, in FIGS. 6 and 7 show the details of the unit. FIGS. 8 through 11 show the individual elements of the unitary apparatus. The unitary apparatus 135 is made by forming the collar 139 by machining or extrusion molding to form the bore 148 and the longitudinal slot 149 and the guide slot 151. The holder is shown in two embodiments. FIG. 11 is formed as a cylinder with the two slots formed along the outer wall, preferably diametrically opposite to each other. The y-shaped connector 141 is inserted into the bore 143 of the holder 135, and the guide pin 153 is inserted into the side of the connector 141 opposite to the slot 149, through the guide slot 151. A threaded hole, or other connecting means, was provided in the flat connector surface 143 to receive the guide pin 153. The guide pin 153 through plot 151 prevents the y-shaped connector 141 from sliding out from the collar 139. This simplifies the work of the ultimate installer of the extension.

The third embodiment of the present invention, as shown in FIGS. 12A-17, provides the installer with a unitary extension part generally indicated by the numeral 235, to be connected to the original short handle original control shaft 3. The assembled unitary extension part 235 is shown in FIGS. 12A and 12B. The unitary extension part 235 has a collar 239 and a y-shaped shaft extender portion 241. The extender portion has two flat sides 243 that are parallel to one another and extend between an open end and a closed end. The thickness of the y-connector portion 241, as measured between the flat sides 243, is the same as that of the original control shaft 3. A substantially rectangular raised key 349 extends from one of the flat sides of the y-connector. The connector portion 241 has arcuate sides 245 extending between the flat sides 243. An internally threaded bore 247 extends longitudinally inward from the open y-end and is sized so as to receive the outer end portion of the original control shaft 3, which is complementarily externally threaded as shown in FIG. 12B.

The collar 239 of this third embodiment is generally cylindrical in shape with a slot 339 extending therethrough. The slot is sized to hold the y-shaped connector 241, and has a keyslot 353 extending above the main slot 339. When the connector part 235 is assembled, the y-connector 241 is pushed through the slot until the key 349 is centered within the collar 339. Two dimples 349 are punched in near the ends of the collar 239 and into the key slot 353, which serve to lock the y-connector 241 within the collar 239, but allow sliding over a limited range, as is shown in FIGS. 12A-B.

The y-shaped extension connector 241 is thus permanently slidably locked within the collar 239, capable of sliding a limited path along the internal bore 339 of the collar 239 between the two dimples 349. The range of the sliding motion is shown by FIGS. 12A-B. The longitudinal bore 339 has a size and shape which generally is complementary in shape, but has sufficient play to permit easy sliding of the extension connector 241 along the bore. The dimples prevent dislocation of the extension connector 241 from out of the bore 339.

Figure 8:
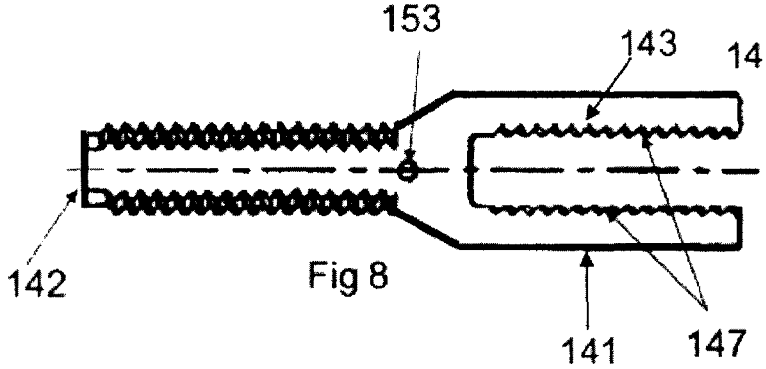
FIG. 8 is a schematic longitudinal top view of the connector portion of the assembled extender apparatus of the present invention.
Figure 9:
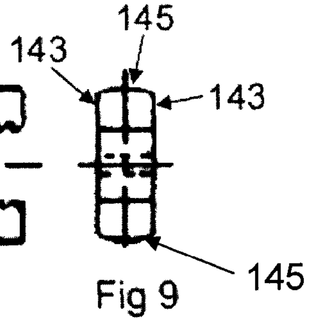
FIG. 9 is a schematic end view of the connector portion of the assembled extender apparatus of the present invention.
Figure 10:
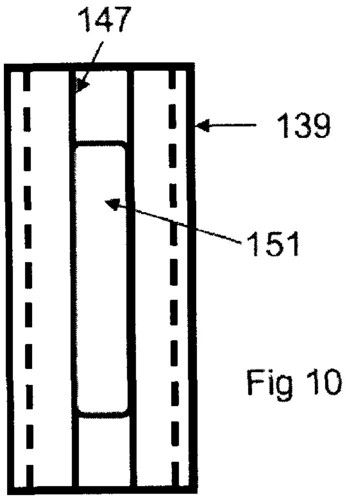
FIG. 10 is a schematic longitudinal bottom view of the collar portion of the assembled extender apparatus of the present invention.
Figure 12B:
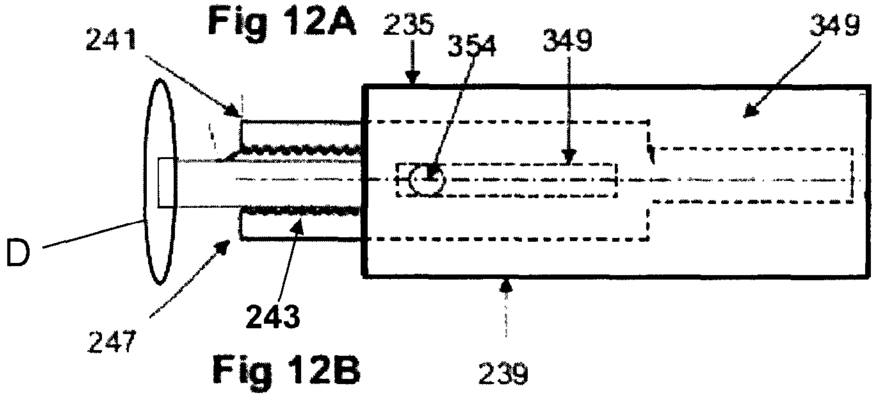
Figures 13, 14, 15:
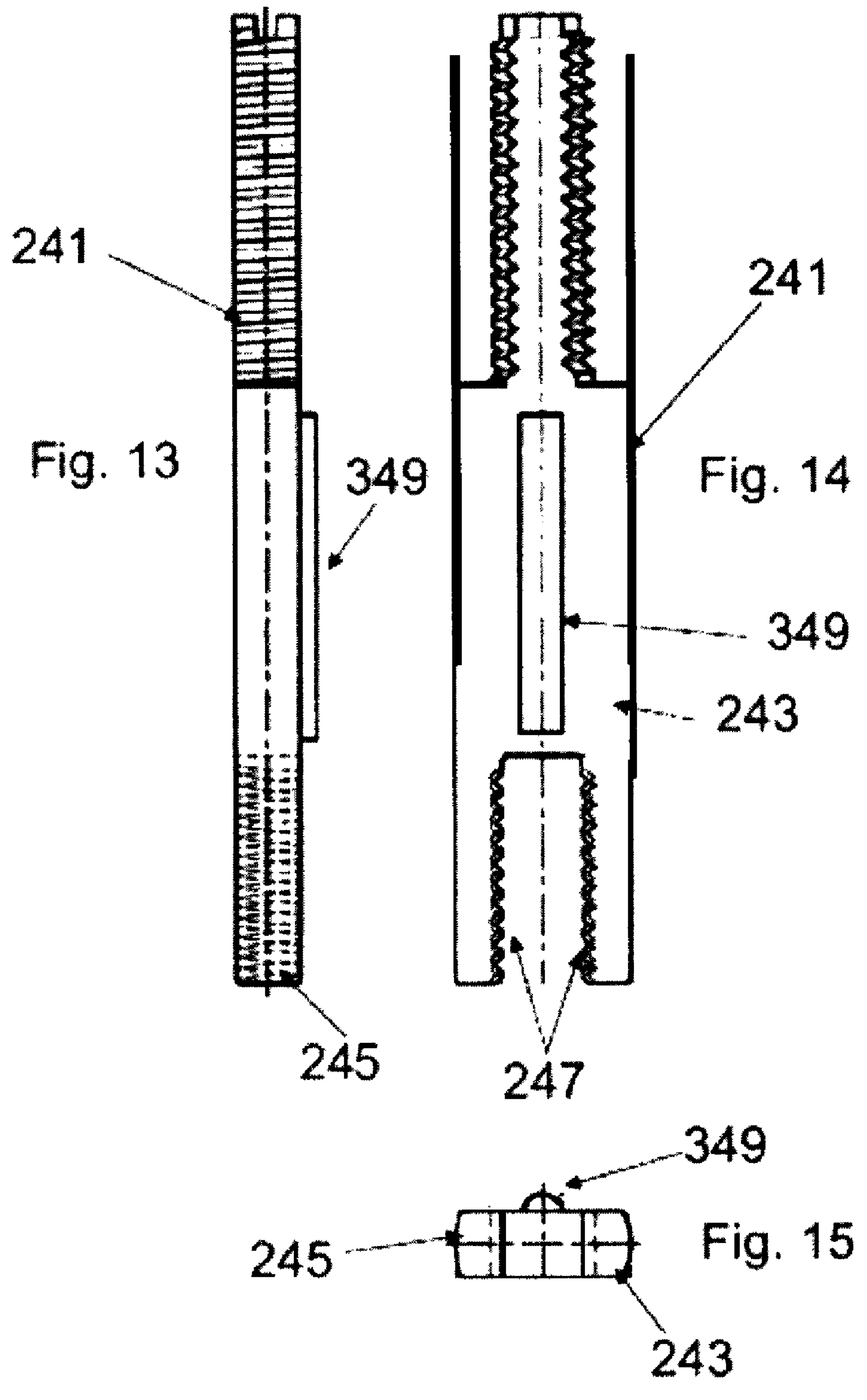
FIG. 13 is a schematic side view of the extender portion of the third embodiment of the present invention.
FIG. 14 is a schematic longitudinal top view of the extender portion of the third embodiment of the assembled extender apparatus of the present invention.
FIG. 15 is a schematic end view of the extender portion of the assembled extender apparatus of the third embodiment of the present invention.
Figure 17:
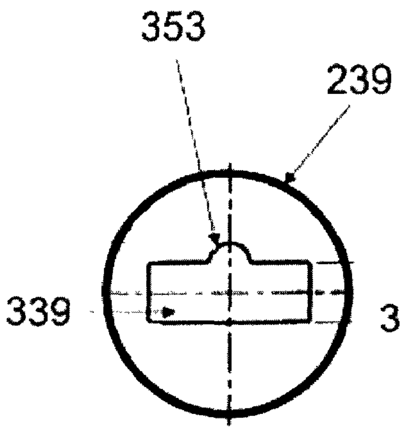
FIG. 17 is a schematic end view of the collar portion of the unitary extender apparatus of the third embodiment of the present invention.
Figure 16:
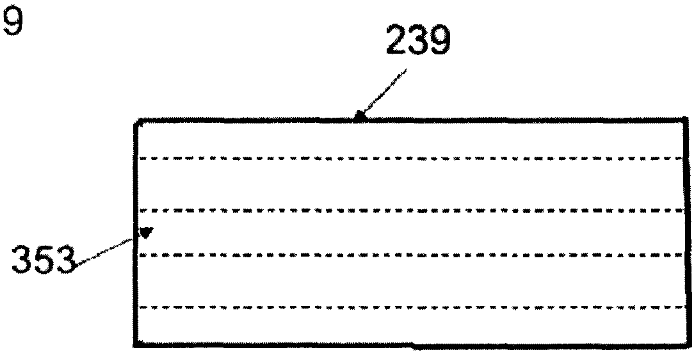
FIG. 16 is a schematic longitudinal side view of the collar portion of the assembled extender apparatus of the third embodiment of the present invention.

As shown in FIG. 12B, at one end of its travel, the y-shaped end 257 of the connector 241 extends out of one end of the holder bore, permitting it to be connected to the original shaft 3, extending out from the duct wall "D". Once the y-shaped end of the connector is properly connected by the threaded surface to the original shaft 3, the collar 139 is permitted to slide down to cover the thus connected connector 241 and the original shaft 3, holding them together, as shown in FIG. 7. As a final step, the handle is secured to the straight end 242 of the extension connector 241, which matches the cross-section shape of the original shaft 3, and is secured in place by the original wing-nut 5, as is shown in FIGS. 1 and 8. As shown, the wing nut 5 secures the handle and the collar onto the connector 241, locking the unitary extension apparatus onto the original shaft.

The schematic representations of the unitary connection apparatus 235, in FIGS. 12A and 12B, show the details of the unit. The collar 239 can be formed in a single step by, preferably, extrusion molding to form the collar 239 and the bore 339, including the key slot 353. The y-shaped connector 241, in this third embodiment, is inserted into the bore 339 of the holder 239, so that the key 253 is inserted into key slot 353. The key 349 is centered within the collar 239, and dimples 354 are punched into the outer circumference of the collar 239, so as to flatten those portions of the key slot 353, so that the y-connector 241 can no longer be removed from the holder. This provides even greater simplification of the work of the ultimate installer.

The foregoing disclosure and the showings made in the drawings are merely illustrative of the principles of this invention and are not to be interpreted in a limiting sense. The invention is properly defined only by the following claims:

What is claimed is:

1. A unitary damper shaft extender for HVAC air ducts, the extender comprising a unitary apparatus including y-shaped shaft connector, a longitudinally extending collar having an outer wall and a longitudinally extending, open ended bore therethrough, the bore being in cross-section being substantially complementary in size and shape to the y-shaped shaft connector to permit sliding of the y-shaped shaft connector through the bore and relative to the holder outer wall, the y-shaped shaft connector being slidably held within the longitudinal open ended bore; and locking means for preventing the removal from the holder bore of the connector, the locking means comprising a guide pin extending from one surface of the connector and a guide slot through the outer wall of the holder and extending only partially along the length of the outer wall, the pin and the guide slot being juxtaposed to allow the pin to slide along the slot for only a limited distance, as the connector is caused to slide through the bore of the holder.

2. An assembly for an extender for a damper shaft for HVAC air ducts, the extender assembly comprising a y-shaped shaft connector, the y-shaped shaft connector having a pair of y-shaped arms at one end with internal threads on the inner facing portions of the two arms, and a leg, centered between the two arms and extending rearwardly therefrom, and having an external thread along its edges; a raised key portion extending outwardly from a major surface of the y-shaped shaft connector and extending along a minor portion of the length of the y-shaped shaft connector; a longitudinally extending collar having an outer wall and a longitudinally extending, keyslot-shaped bore therethrough, the bore comprising a major portion complementarily shaped and sized to the outer s edges of the arms of the y-shaped shaft connector, so as to permit sliding of the y-shaped shaft, connector through the bore relative to the collar outer wall; a minor portion of the bore having a smaller width but extending the full length of the bore and being open to the major portion; the key portion fitting within the minor bore portion when the connector is slidably held within the longitudinal open ended bore; and locking means for preventing the removal from the keyslot bore of the y-shaped shaft connector, the locking means comprising a pair of indentations extending into the keyslot adjacent the ends of the collar, preventing the key extending from one surface of the y-shaped shaft connector from passing the dimples.

* * * * *